United States Patent Office 3,138,591
Patented June 23, 1964

3,138,591
10-11 LACTONES OF THE PREGNANE SERIES AND PROCESS FOR PREPARING SAME
Gérard Nominé, Noisy-le-Sec, and Robert Bucourt, Clichy-sous-Bois, France, assignors to Roussel-UCLAF, S.A., Paris, France, a corporation of France
No Drawing. Filed Oct. 23, 1962, Ser. No. 232,569
Claims priority, application France Oct. 28, 1961
20 Claims. (Cl. 260—239.57)

The invention relates to novel 10-11 lactones of $\Delta^4$-estrene-10β-carboxylic acids which have the formula

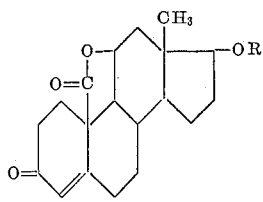

wherein R is selected from the group consisting of hydrogen and an acyl radical of a hydrocarbon carboxylic acid having 1 to 7 carbon atoms. The invention also relates to a novel method for the preparation of 10-11 lactones of Formula I and novel intermediates formed therein.

The 10-11 lactones of Formula I are important intermediates in the steroid synthesis and are especially valuable as intermediates for the preparation of 11β-hydroxy-19-nortestosterone which has previously only been obtainable by microbiological means or by a difficult series of reactions starting from $\Delta^{1,4,17(20)}$-pregnatriene-11β,21-diol-3-one (Magerlein et al., J.A.C.S., vol 79, 1957, p. 1508).

It is an object of the invention to provide the novel 10-11 lactones of Formula I which are valuable steroid intermediates.

It is another object of the invention to provide a novel process for the preparation of the 10-11 lactones of Formula I.

It is a further object of the invention to provide novel intermediates for the preparation of the 10-11 lactones of Formula I.

These and other objects and advantages of the invention will become obvious from the following detailed description.

The 10-11 lactones of the invention have the formula

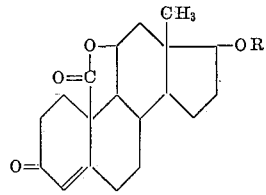

wherein R is selected from the group consisting of hydrogen and an acyl radical of a hydrocarbon carboxylic acid having 1 to 7 carbon atoms.

The acyl radical of the hydrocarbon carboxylic acid having 1 to 7 carbon atoms can be derived from aliphatic acids such as acetic acid, propionic acid, butyric acid, isobutyric acid, valeric acid, isovaleric acid, etc. and aromatic acids such as benzoic acid.

The process of the invention for the preparation of the 10-11 lactones of Fomula I comprises reacting 5-lower alkylenedioxy - 9α,11α-epoxy-17β-acyloxy-des A-estrane wherein the acyl radical is derived from a hydrocarbon carboxylic acid having 1 to 7 carbon atoms with formic acid to form 17β-acyloxy-des A-estrane-5,11-dione, reacting the latter with a ketalizing agent to form 5-lower alkylene dioxy-17β-acyloxy-des A-estrane-11-one, reducing the latter with an alkaline hydride to form 5-lower alkylenedioxy-17β-OR-des A-estrane-11β-ol wherein R has the above definition hydrolyzing the latter under acidic conditions to form 17β-OR-des A-estrane-11β-ol-5-one, reacting the latter to form the 10-11 lactone of 17β-OR-des A-estrane-11β-ol-5-one-10β-carboxylic acid, condensing the latter with methyl vinyl ketone in the presence of an alkaline condensation agent to form the 10-11 lactone of 17β-OR-4,5-seco-estrane-11β-ol-3,5-dione-10-β-carboxylic acid, reacting the latter with a secondary amine to form a mixture of the 10-11 lactone of 3-enamino-17β-OR-$\Delta^{3,5}$-estradiene-11β-ol-10β-carboxylic acid and the 10-11 lactone of 3-enamino-17β-OR-$\Delta^3$-estrene-5,11-diol-10β-carboxylic acid, hydrolyzing the said mixture under acidic conditions to form the 10-11 lactone of 17β-OR-$\Delta^4$-estrene-11β-ol-3-one-10-β-carboxylic acid wherein R has the above definition and recovering the latter.

The 10-11 lactone of 17β-OR-des A-estrane-11β-ol-5-one-10β-carboxylic acid may be formed by reacting 17β-OR-des A-estrane-11β-ol-5-one with a lower alkyl carbonate such as ethyl carbonate in the presence of a reactant capable of transforming a carbonyl radical into its metallic enolate such as an alkali metal alcoholate such as sodium methylate or potassium tert-butylate or an alkali metal hydride such as sodium hydride.

Another method of forming the 10-11 lactone of 17β-OR-des A-estrane-11β-ol-5-one-10β-carboxylic acid wherein R is an acyl radical of a hydrocarbon carboxylic acid having 1 to 7 carbon atoms is by reacting 17β-OR-des A-estrane-11β-ol-5-one, wherein R has the above definition, with a lower alkyl formate in the presence of a compound capable of transforming a carbonyl radical into its metallic enolate such as alkali metal hydrides or alkali metal alcoholates to form the 10-11 hemiacetal of 10β-formyl-17β-OR-des A-estrane-11β-ol-5-one and oxidizing the latter to form the 10-11 lactone of 17β-OR-des A-estrane-11β-ol-5-one-10β-carboxylic acid, wherein R has the above definition.

The acylation of 17β-OR-des A-estrane-11β-ol-5-one is unexpected as the acylation would normally be expected to occur at the 6-position since substitutions, particularly acylation, of a trans-decalone of the formula

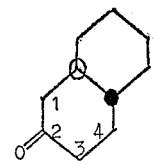

are known to normally occur in the 3-position. It is believed that the presence of the 11-hydroxyl group of 17β-OR-des A-estrane-11β-ol-5-one causes the abnormal orientation of this acylation.

The stereo specific reduction of the 11-one grouping of 5-lower alkylenedioxy-17β-acyloxy-des A-estrane-11-one may be effected with an alkaline hydride. If lithium aluminium hydride is used, the 17β-acyloxy group can be simultaneously saponified to the free alcohol by operating at reflux temperatures. When using an alkali metal borohydride such as potassium borohydride or sodium borohydride at temperatures of 0 to 25° C., saponification is avoided.

The secondary amines used to cyclize the 10-11 lactone of 17β-OR-4,5-seco-estrane-11β-ol-3,5-dione-10β - carboxylic acid have the formula

wherein $R_1$ and $R_2$ are lower alkyl radicals having 1 to 7 carbon atoms and when taken together with the nitrogen atom from a cyclic amine selected from the group consisting of morpholine, pyrrolidine and piperidine.

A preferred mode of the process of the invention comprises reacting 5-ethylenedioxy-9α,11α-epoxy-17β-benzoyloxy-des-A-estrane with formic acid to form 17β-benzoyloxy-des A-estrane-5,11-dione, reacting the latter with methyl ethyl dioxolane in the presence of p-toluene sulfonic acid to form 5-ethylenedioxy-17β-benzoyloxy-des A-estrane-11-one, reducing the latter with an alkaline hydride to form 5-ethylenedioxy-17β-OR'-des A-estrane-11β-ol wherein R' is selected from the group consisting of hydrogen and benzoyl, hydrolyzing the latter in the presence of an acid to form 17β-OR'-des A-estrane-11β-ol-5-one, reacting the latter to form the 10-11 lactone of 17β-OR'-des A-estrane-11β-ol-5-one - 10β - carboxylic acid, condensing the latter with methyl vinyl ketone in the presence of a tertiary amine such as triethylamine to form the 10-11 lactone of 17β-OR'-4,5-seco-estrane-11β-ol-3,5-dione-10β-carboxylic acid, reacting the latter with pyrrolidine in an inert organic solvent such as a lower alkanol or a hydrocarbon such as benzene in the presence of p-toluene sulfonic acid to form a mixture of the 10-11 lactone of 3-pyrrolidino-17β-OR'-Δ$^{3,5}$-estradiene-11β - ol - 10β - carboxylic acid and the 10-11 lactone of 3-pyrrollidino-17β-OR'-Δ$^3$-estrene-5,11β-diol-10β-carboxylic acid, hydrolyzing the latter mixture under acidic conditions such as aqueous formic acid or aqueous acetic acid or by boiling in an alcoholic solution of acetic acid and sodium acetate to form the 10-11 lactone of 17β-OR'-Δ$^4$-estrene-11β-ol-3-one-10β-carboxylic acid wherein R' is selected from the group consisting of hydrogen and benzoyl and recovering the latter. The reaction scheme is illustrated in Table I.

TABLE I

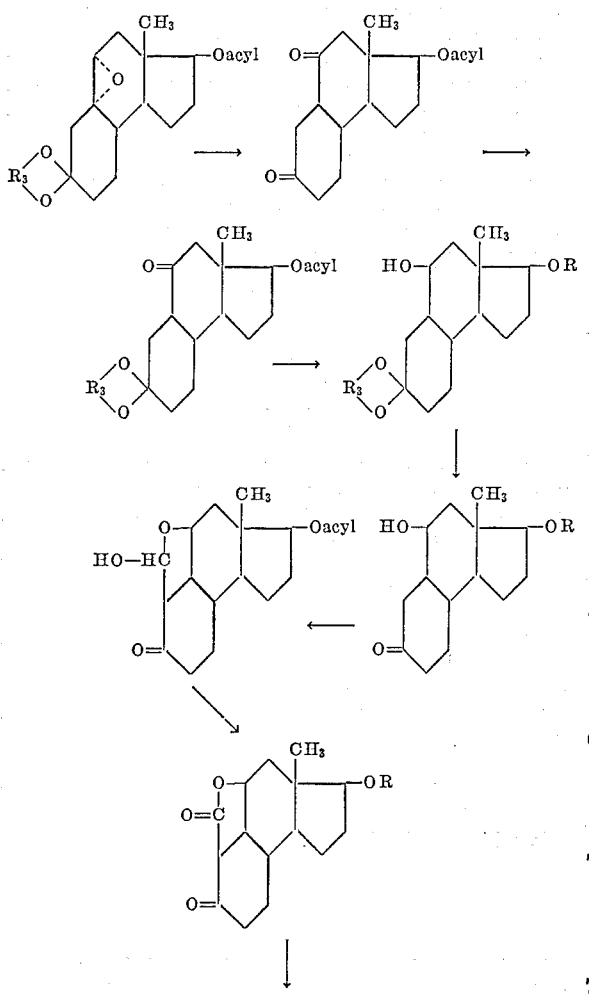

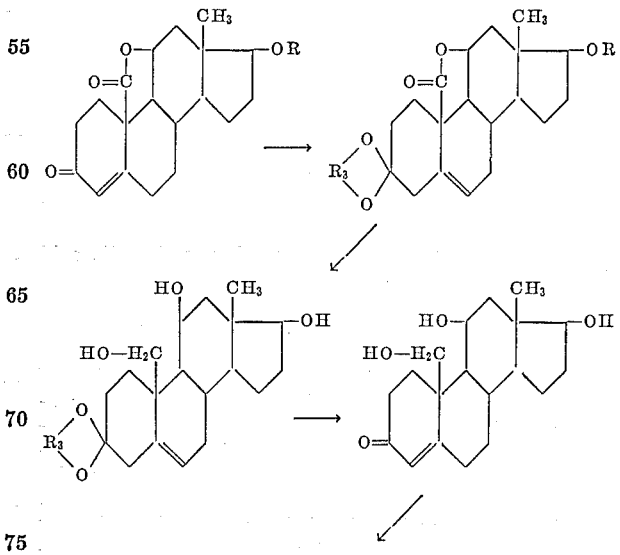

wherein acyl, R, $R_1$ and $R_2$ have the above definitions and $R_3$ is a lower alkylene radical.

The 10-11 lactones of 17β-OR'-Δ$^4$-estrene-11β-ol-3-one-10β-carboxylic acid of the invention are useful intermediates for the preparation of 11β-hydroxy-19-nor-testosterone according to the process of the commonly assigned U.S. application Serial No. 232,609, filed on even date herewith. The process comprises forming the 3-lower alkylene ketal of the 10-11 lactone of 17β-OR-Δ$^4$-estrene-11β-ol-3-one-10β-carboxylic acid, reducing the latter to form the 3-lower alkylene ketal of Δ$^4$-androstene-11β,17β,19-triol-3-one, hydrolyzing the latter to form Δ$^4$-androstene-11β,17β,19-triol-3-one, subjecting the latter to alkaline degradation to form 11β-hydroxy-19-nor-testosterone and recovering the latter. The reaction scheme is illustrated in Table II.

TABLE II

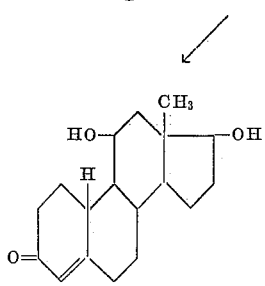

wherein R and $R_3$ have the above definitions.

The 5-lower alkylenedioxy-9α,11α - epoxy - 17β-OR-des A-estranes which are used as the starting materials of the invention may be prepared as described in the commonly-assigned, copending U.S. patent application Serial No. 164,135, filed January 3, 1962, by ketalizing 17β-OR-Δ⁹-des A-estrene-5-one and epoxidizing the latter. The reaction scheme is illustrated in Table III.

TABLE III

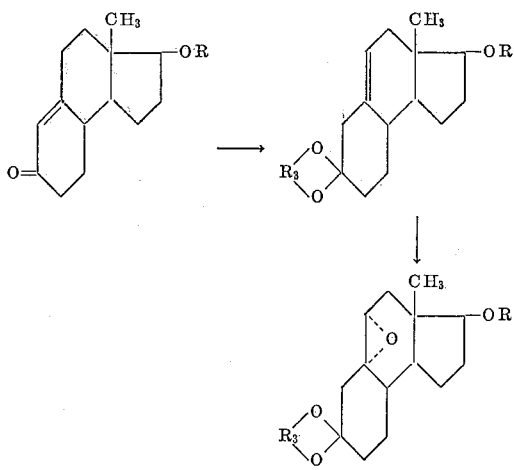

wherein R and $R_3$ have the above definitions.

In the following examples there are described several preferred embodiments to illustrate the invention. However, it should be understood that the invention is not intended to be limited to the specific embodiments.

EXAMPLE I

*Preparation of Starting Materials*

STEP A.—5-ETHYLENEDIOXY-17β-BENZOYLOXY-Δ⁹⁽¹¹⁾-DES A-ESTRENE 30 g. of 17β-benzoyloxy-Δ⁹⁽¹⁰⁾-des A-estrene - 5 - one, having a melting point of 155° C. and a specific rotation $[\alpha]_D^{20} = +52°$ (methanol) obtained according to Velluz et al., C.R. Acad. Sci. 1960, 250, 1084–1085, were introduced into 960 cc. of anhydrous benzene. 66 cc. of ethylene glycol and 360 mgm. of p-toluene sulfonic acid were added and the mixture was heated to reflux under an atmosphere of nitrogen while agitating for a period of six and a half hours while eliminating the water formed in the course of the reaction by entraining it with benzene.

After cooling, the mixture was poured into water saturated with sodium bicarbonate and decanted. The organic phase was dried over sodium sulfate and then evaporated to dryness under vacuum. The residue was crystallized from methanol containing 1 part per 1000 of pyridine and supplied 27.6 g. of 5-ethylenedioxy-17β-benzoyloxy-Δ⁹⁽¹¹⁾-des A-estrene, having a melting point of 93° C., and a specific rotation $[\alpha]_D^{20} = +6.5°$ (c.=1% in methanol).

The product occurred in the form of a white product, soluble in methylene chloride and insoluble in water.

STEP B.—5-ETHYLENEDIOXY-9α,11α-EPOXY-17β-BENZOYLOXY-DES A-ESTRANE 26 g. of 5-ethylenedioxy-17β-benzoyloxy-Δ⁹⁽¹¹⁾-des A-estrene were introduced into 375 cc. of dichloroethane and then 150 cc. of an ethereal solution containing 30.3 g. of perphthalic acid per 100 cc. were added. The mixture was agitated for a period of 15 minutes and then allowed to stand at room temperature overnight. The reaction mixture was poured into water saturated with sodium bicarbonate and the organic phase was decanted. The aqueous phase was extracted with ethylene chloride and the combined organic liquids were dried and evaporated to dryness under vacuum. The residue comprised 5-ethylenedioxy-9α,11α-epoxy - 17β-benzoyloxy-des A-estrane which was recrystallized from methanol containing 1 part per 1000 of pyridine. The yield was 24.3 g. of a white product melting at 203° C. and having a specific rotation $[\alpha]_D^{20} = +28.7°$ (c.=0.6% in chloroform). The product was soluble in chloroform, slightly soluble in methanol and insoluble in water.

EXAMPLE II

*The 10-11 Lactone of 17β-Benzoyloxy-Δ⁴-Estrene-11β-Ol-3-One-10β-Carboxylic Acid*

STEP A.—17β-BENZOYLOXY-DES A-ESTRANE-5,11-DIONE 24 g. of 5-ethylenedioxy-9α,11α-epoxy-17β-benzoyloxy-des A-estrane were introduced into a mixture of 240 cc. of acetone, 240 cc. of formic acid and 48 cc. of water and the mixture was heated to reflux for a period of 4 hours. The resulting mixture was poured into 1800 cc. of methylene chloride and 1800 cc. of an aqueous solution saturated with sodium bicarbonate were added. The organic phase was decanted, dried, and evaporated to dryness under vacuum. The residue was treated with 72 cc. of boiling isopropyl ether and cooled to 20° C. The precipitate was vacuum filtered and washed with isopropyl ether. 16.3 g. of 17β-benzoyloxy-des A-estrane-5,11-dione having a melting point of 131–132° C. and a specific rotation $[\alpha]_D^{20} = +56.8°$ (c.=1% in methanol) were obtained.

The product occurred in the form of white crystals and was soluble in methanol and methylene chloride, very slightly soluble in isopropyl ether and insoluble in water.

This compound is not described in the literature.

STEP B.—5-ETHYLENEDIOXY-17β-BENZOYLOXY-DES A-ESTRANE-5,11-DIONE 16 g. of 17β-benzoyloxy-des A-estrane-5,11,dione were introduced into a mixture of 160 cc. of benzene, 160 cc. of methylethyl dioxolane and 480 mg. of p-toluene sulfonic acid. The reaction mixture was agitated at room temperature for a period of 3 hours and then poured into water saturated with sodium bicarbonate and extracted with benzene. The extracts were dried over magnesium sulfate and then evaporated to dryness under vacuum. The residue was crystallized from methanol containing 1 part per 1000 of pyridine and supplied 15.27 g. of 5-ethylenedioxy-17β-benzoyloxy-des A-estrane-11-one having a melting point of 145° C. and a specific rotation $[\alpha]_D^{20} = +64°$ (c.=1% in dioxane).

The product occurred in the form of white crystals and was soluble in methylene chloride and dioxane, slightly soluble in isopropyl ether and insoluble in water.

This compound is not described in the literature.

STEP C.—5-ETHYLENEDIOXY-17β-BENZOYLOXY-DES A-ESTRANE-11β-OL 6.509 g. of 5-ethylenedioxy-17β-benzoyloxy-des A-estrane-11-one (obtained according to Step B) were introduced into 260 cc. of anhydrous tetrahydrofuran. The mixture was cooled to −5° C. and then 6.509 g. of potassium borohydride in 130 cc. of water were added. The reaction mixture was agitated for a period of two hours at 0° C. and then extracted with methylene chloride. The extracts were washed with water, dried and evaporated to dryness under vacuum. The residue was crystallized from isopropyl ether and furnished 5.362 g. of 5-ethylenedioxy-17β-benzoyloxy-des A-estrane-11β-ol having a melting point of 222° C. and a specific rotation $[\alpha]_D^{20} = +60°$ (c.=1% tetrahydrofuran).

The product occurred in the form of white crystals, soluble in chloroform and insoluble in water.

*Analysis.*—$C_{23}H_{30}O_5$; molecular weight=386.47. Calculated: C, 71.48%; H, 7.82%. Found: C, 71.6%; H, 7.9%.

This compound is not described in the literature.

STEP D.—17β-BENZOYLOXY-DES A-ESTRANE-11β-OL-5-ONE 2.14 g. of 5-ethylenedioxy-17β-benzoyloxy-des A-estrane-11β-ol were introduced into 49 cc. of acetic acid containing 15% of water. The reaction mixture was agitated at 60° C. for a period of one hour and then was poured into water saturated with sodium bicarbonate and extracted with methylene chloride. The methylene chloride extracts were washed with water, dried and evaporated to dryness under vacuum. The residue was crystallized from isopropyl ether and furnished 1.822 g. of 17β-benzoyloxy-des A-estrane-11β-ol-5-one having a melting point of 155° C. and a specific rotation $[\alpha]_D^{20} = +46.5°$ (c.=1% in methanol).

The product occurred in the form of white crystals, soluble in chloroform and in hot alcohol, and insoluble in water.

*Analysis.*—$C_{21}H_{26}O_4$; molecular weight=342.42. Calculated: C, 73.66%; H, 7.66%. Found: C, 73.6%; H, 7.7%.

This compound is not described in the literature.

STEP E.—10-11 HEMI-ACETAL OF 10β-FORMYL-17β-BENZOYLOXY-DES A-ESTRANE-11β-OL-5-ONE 10.25 g. of 17β-benzoyloxy-des A-estrane-11β-ol-5-one were introduced into 320 cc. of anhydrous toluene. 3.235 g. of sodium methylate and 4.59 cc. of pure ethyl formate were added and the reaction mixture was agitated at room temperature in an atmosphere of nitrogen for a period of an hour and a half. Next, 200 cc. of water and 140 cc. of N sodium hydroxide solution were added. The reaction mixture was agitated and then the aqueous alkaline solution was decanted and neutralized by use of a cation exchange resin in its acid form (Dowex 50 resin) in the presence of methylene chloride. The resin was separated, the organic phase was decanted, dried and evaporated to dryness under vacuum. The residue was dissolved in 30 cc. of methanol containing 0.3 cc. of acetic acid and 0.7 cc. of triethylamine. The mixture was allowed to stand at room temperature overnight and was then vacuum filtered. The residue was washed with methanol, dried and 6.496 g. of the hemi-acetal of 10β-formyl-17β-benzoyloxy-des A-estrane-11β-ol-5-one having a melting point of 170° C. and 204° C. and a specific rotation $[\alpha]_D^{20} = 56°$ (c.=1% in tetrahydrofuran) were obtained.

The product occurred in the form of white crystals, soluble in chloroform, slightly soluble in alcohol and insoluble in water.

This compound is not described in the literature.

STEP F.—THE 10-11 LACTONE OF 17β-BENZOYLOXY-DES A-ESTRANE-11β-OL-5-ONE-10β-CARBOXYLIC ACID 2.375 g. of the hemi-acetal of 10β-formyl-17β-benzoyloxy-des A-estrane-11β-ol-5-one were introduced into 11.8 cc. of acetic acid. The mixture was cooled, then a solution of 1.41 gm. of chromium trioxide, 9.4 cc. of water and 30 cc. of acetic acid was added. The reaction mixture was agitated at room temperature for a period of an hour and 15 minutes and then poured on ice and alkalinized by the addition of sodium bicarbonate. The product formed was vacuum filtered, washed with water, dried and recrystallized from ethyl acetate. 1.147 g. of the 10-11 lactone of 17β-benzoyloxy-des A-estrane-11β-ol-5-one-10β-carboxylic acid having a melting point of 246° C. and a specific rotation $[\alpha]_D^{20} = +66°$ (c.=1% in chloroform) were obtained.

The product occurred in the form of white crystals, and was soluble in cold chloroform, hot alcohol and acetone, insoluble in water.

This compound is not described in the literature.

STEP G.—10-11 LACTONE OF 17β-BENZOYLOXY-4,5-SECO-ESTRANE-11β-OL-3,5-DIONE-10β-CARBOXYLIC ACID 1.147 g. of the 10-11 lactone of 17β-benzoyloxy-des A-estrane-11β-ol-5-one-10β-carboxylic acid were introduced into 2.29 cc. of anhydrous ethyl acetate. 4.58 cc. of distilled methyl vinyl ketone and 1.14 cc. of a solution containing 20% of triethylamine in ethyl acetate were added. The reaction mixture was agitated at room temperature for a period of 16 hours. Next the reaction mixture was evaporated to dryness under vacuum and the residue was crystallized from ethyl acetate. 1.026 g. of the 10-11 lactone of 17β - benzoyloxy-4,5-seco-estrane-11β-ol-3,5-dione-10β-carboxylic acid having a melting point of 182° C. and a specific rotation $[\alpha]_D^{20} = +25.8°$ (c.=1.25% in dioxane) were obtained.

The product occurred in the form of white crystals, and was soluble in chloroform and in hot acetone and alcohol, and insoluble in water.

This compound is not described in the literature.

STEP H.—THE 10-11 LACTONE OF 3-PYRROLIDYL-17β-BENZOYLOXY - $\Delta^{3,5}$ - ESTRADIENE - 11β - OL - 10β-CARBOXYLIC ACID AND THE 10-11 LACTONE OF 3-PYRROLIDYL - 17β - BENZOYLOXY - $\Delta^3$ - ESTRENE-5,11β-DIOL-10β-CARBOXYLIC ACID 3.113 g. of the 10-11 lactone of 17β-benzoyloxy-4,5-seco - estrane-11β-ol-3,5-dione-10β-carboxylic acid were introduced into 34 cc. of anhydrous methanol containing 3.1 cc. of pyrrolidine and the reaction mixture was heated under agitation until solution was complete. The heating was stopped immediately after this and the mixture was allowed to stand at room temperature for a period of 20 minutes in the absence of light, and then was vacuum filtered. The precipitate was washed with methanol, dried and 3.183 g. of a crystalline product comprising a mixture of the 10-11 lactone of 3-pyrrolidyl-17β-benzoyloxy-$\Delta^{3,5}$-estradiene-11β-ol-10β-carboxylic acid and the 10-11 lactone of 3-pyrrolidyl-17β-benzoyloxy-$\Delta^3$-estrene-5,11β-diol-10β-carboxylic acid were obtained. The mixture obtained was used as such in the next step of the synthesis.

These two compounds are not described in the literature.

STEP I.—10-11 LACTONE OF 17β-BENZOYLOXY-$\Delta^4$-ESTRENE-11β-OL-3-ONE-10β-CARBOXYLIC ACID The mixture of the two enamines obtained in the preceding step was dissolved in 2 volumes of formic acid. 20 volumes of water were added and the reaction mixture was allowed to stand at room temperature for a period of 24 hours. The product formed was vacuum filtered, washed with water, dried, and then the raw product thus obtained was dissolved in 2 cc. of acetic acid containing 10% of perchloric acid, and the mixture was allowed to stand for a period of one hour. The solution was poured into a mixture of water and ice and neutralized very slowly with sodium bicarbonate. The precipitate was vacuum filtered, washed with water, dried and the 10-11 lactone of 17β - benzoyloxy-$\Delta^4$-estrene-11β-ol-3-one-10β-carboxylic acid was obtained which was recrystallized several times from methyl acetate. The product occurred in the form of white crystals melting at 230° C. and was soluble in hot alcohol and acetone and insoluble in water.

*Analysis.*—$C_{26}H_{28}O_5$; molecular weight=420.48. Calculated: C, 74.26%; H, 6.71%. Found: C, 74.3%; H, 6.9%.

This compound is not described in the literature.

EXAMPLE III

*Preparation of the 10-11 Lactone of $\Delta^4$-Estrene-11β,17β-Diol-3-One-10β-Carboxylic Acid*

STEP A.—17β-BENZOYLOXY-DES A-ESTRANE-5,11-DIONE 24 g. of 5-ethylenedioxy-9α,11α-epoxy-17β-benzoyloxy-des A-estrene were introduced into a mixture of 240 cc. of acetone, 240 cc. of formic acid and 480 cc. of water and the mixture was heated to reflux for a period of 4 hours. The resulting mixture was poured into 1800 cc. of methylene chloride and 1800 cc. of an aqueous solution saturated with sodium bicarbonate were added. The organic phase was decanted, dried and evaporated to dryness under vacuum. The residue was treated with 72 cc. of boiling isopropyl ether and cooled to 20° C. The precipitate was vacuum filtered and washed with isopropyl ether. 16.3 g. of 17β-benzoyloxy-des A-estrane-5,11-dione having a melting point of 131–132° C. and a specific rotation $[\alpha]_D^{20} = +56.8°$ (c.=1% in methanol) were obtained.

The product occurred in the form of white crystals and was soluble in methanol and methylene chloride, very slightly soluble in isopropyl ether and insoluble in water.

STEP B.—5-ETHYLENEDIOXY-17β-BENZOYLOXY-DES A-ESTRANE-11-ONE 16 g. of 17β-benzoyloxy-des A-estrane-5,11-dione were introduced into a mixture of 160 cc. of benzene, 160 cc. of methylethyl dioxolane and 480 mg. of p-toluene sulfonic acid. The reaction mixture was agitated at room temperature for a period of 3 hours and was then poured into water saturated with sodium bicarbonate and extracted with benzene. The extracts were dried over magnesium sulfate and then evaporated to dryness under vacuum. The residue was crystallized from methanol containing 1 part per 1000 of pyridine and supplied 15.27 g. of 5-ethylenedioxy-17β-benzoyloxy-des A-estrane-11-one having a melting point of 145° C. and a specific rotation $[\alpha]_D^{20} = +64°$ (c.=1% in dioxane).

The product occurred in the form of white crystals and was soluble in methylene chloride, dioxane, slightly soluble in isopropyl ether and insoluble in water.

STEP C.—5-ETHYLENEDIOXY-DES A-ESTRANE-11β,17β-DIOL 0.6 g. of 5 - ethylenedioxy-17β-benzoyloxy-des A-estrane-11-one were introduced into 13.5 cc. of anhydrous tetrahydrofuran. 0.6 g. of lithium-aluminum hydride were added and the reaction mixture was heated to reflux for a period of 45 minutes. After cooling, 90 cc. of tetrahydrofuran were readded and then 20 cc. of an aqueous solution saturated with sodium bicarbonate and containing 1.8 g. of potassium and sodium tartrate were added. The organic phase was decanted, washed with several cc. of a solution saturated with sodium chloride, and dried over sodium sulfate. Then the organic phase was evaporated to dryness under vacuum. The residue crystallized from isopropyl ether and furnished 397 mg. of 5-ethylenedioxy-des A-estrane-11β,17β-diol having a melting point of 177° C. and a specific rotation $[\alpha]_D^{20} = +32.8°$ (c.=0.95% in methanol).

The product occurred in the form of white crystals and was soluble in alcohol and water, slightly soluble in benzene and chloroform.

*Analysis.*—$C_{16}H_{26}O_4$; molecular weight=282.37. Calculated: C, 68.05%; H, 9.28%. Found: C, 68.2%; H, 9.1%.

This compound is not described in the literature.

STEP D.—DES A-ESTRANE-11β,17β-DIOL-5-ONE 903 mgm. of 5-ethylenedioxy-des A-estrane-11β,17β-diol were introduced into 21 cc. of acetic acid containing 3.5 cc. of water and the mixture was heated at 60° C. for a period of one hour. The reaction mixture was concentrated to a small volume and after 90 cc. of methylethyl ketone were added, 13 cc. of sodium hydroxide solution were added drop by drop. The mixture was dried over sodium sulfate, filtered and evaporated to dryness under vacuum. The residue was crystallized from isopropyl ether and supplied 762 mgm. of des A-estrane-11β, 17β-diol-5-one having a melting point of 190° C. and a specific rotation $[\alpha]_D^{20} = +8.7°$ (c.=1% in methanol).

The product was white, slightly soluble in water, and poorly soluble in benzene and chloroform.

*Analysis.*—$C_{14}H_{22}O_3$; molecular weight=238.32. Calculated: C, 70.55%; H, 9.3%. Found: C, 70.8%; H, 9.4%.

This compound is not described in the literature.

STEP E.—THE 10-11 LACTONE OF DES A-ESTRANE-11β, 17β-DIOL-5-ONE-10β-CARBOXYLIC ACID 0.46 g. of dry sodium methylate were introduced into 12 cc. of anhydrous tetrahydrofuran. 1 cc. of ethyl carbonate and 0.4 g. of des A-estrane-11β,17β-diol-5-one were added. The reaction mixture under an atmosphere of nitrogen was heated to reflux for a period of 16 hours. After cooling, 0.52 cc. of acetic acid were added and the mixture was agitated for a period of three hours. Thereafter, the reaction mixture was extracted with methylene chloride and the extracts were washed with water, dried and evaporated to dryness under vacuum. The residue was crystallized from a mixture of isopropyl ether and methanol (4:1) and supplied 0.25 g. of the 10-11 lactone of des A-estrane-11β,17β-diol-5-one-10β-carboxylic acid having a melting point of 204° C. and a specific rotation $[\alpha]_D^{20} = +89.5°$ (c.=1% in methanol).

The product was a white crystalline solid and was soluble in cold chloroform and in hot acetone and hot alcohol and insoluble in water.

This compound is not described in the literature.

STEP F.—THE 10-11 LACTONE OF 4,5-SECO-ESTRANE-11β,17β-DIOL-3,5-DIONE-10β-CARBOXYLIC ACID 17.5 g. of the 10-11 lactone of des A-estrane-11β,17β-diol-5-one-10β-carboxylic acid were introduced into 35 cc. of anhydrous ethyl acetate. 70 cc. of methyl vinyl ketone and 17.5 cc. of a solution containing 20% of triethylamine in ethyl acetate were added. The reaction mixture was agitated at room temperature for a period of 16 hours and then evaporated to dryness under vacuum and the residue was crystallized from ethyl acetate. 18.66 g. of the 10-11 lactone of 4,5-seco-estrane-11β,17β-diol-3,5-dione-10β-carboxylic acid were obtained, being a yield of 84.5%. The product had a melting point of 168° C. and a specific rotation $[\alpha]_D^{20} = +24°$ (c.=1% in methanol).

The product occurred in the form of white crystals and was slightly soluble in alcohol, isopropyl ether and ethyl acetate and insoluble in water and dilute acids and alkalis.

*Analysis.*—$C_{19}H_{26}O_5$; molecular weight=334.4. Calculated: C, 68.23%; H, 7.83%. Found: C, 68.3%; H, 7.7%.

This compound is not described in the literature.

STEP G.—THE 10-11 LACTONE OF 3-PYRROLIDYL-$\Delta^{3,5}$-ESTRADIENE - 11β,17β - DIOL - 10β-CARBOXYLIC ACID AND THE 10-11 LACTONE OF 3-PYRROLIDYL-$\Delta^3$-ESTRENE-5,11β,17β-TRIOL-10β-CARBOXYLIC ACID 4.5 g. of the 10-11 lactone of 4,5-seco-estrane-11β,17β-diol-3,5-dione-10β-carboxylic acid were dissolved in 180 cc. of anhydrous benzene containing 9 cc. of pyrrolidine and 0.09 g. of p-toluene sulfonic acid. The reaction mixture was heated under agitation in an atmosphere of nitrogen for a period of 4 hours. Thereafter the reaction mixture was alkalinized by the addition of sodium bicarbonate. The product formed was extracted with methylene chloride and the extracts were evaporated to dryness and the residue was recrystallized from methanol. 4.195 g. of a product which was a mixture of the 10-11 lactone of 3-pyrrolidyl-$\Delta^3$-estrene-5,11β,17β-triol-10β-carboxylic acid and the 10-11 lactone of 3-pyrrolidyl-$\Delta^{3,5}$ estradiene-11β, 17β-diol-10β-carboxylic acid were obtained.

The product occurred in the form of crystals and was insoluble in water and dilute alkalis, slightly soluble in alcohol, ether, acetone and benzene, and soluble in chloroform and dilute acids.

This compound is not described in the literature.

STEP H.—THE 10-11 LACTONE OF Δ⁴-ESTRENE-11β,17β-DIOL-3-ONE-10β-CARBOXYLIC ACID 4.15 g. of a mixture of the 10-11 lactones obtained according to Step G were introduced into 105 cc. of a solution of 15 gm. of sodium acetate, 15 cc. of distilled water, 10 cc. of acetic acid and 100 cc. of methanol. The reaction mixture was heated to reflux in an atmosphere of nitrogen for a period of 5 hours and was then allowed to stand at room temperature under agitation in an atmosphere of nitrogen overnight.

The reaction mixture was extracted with methylene chloride. The methylene chloride extracts were poured into water and neutralized with a solution of sodium bicarbonate. The organic phase was vacuum filtered, washed with water, evaporated to dryness under vacuum to obtain 3.70 g. of the 10-11 lactone of Δ⁴-estrene-11β,17β-diol-3-one-10β-carboxylic acid being a quantitative yield.

U.V. spectrum in ethanol:

λ max. 242 mμ,
$E_{1\ cm.}^{1\%} = 282$
ε8900

This compound is not described in the literature.

Various modifications of the process and composition of the invention may be made without departing from the spirit or scope thereof and it is to be understood that the invention is to be limited only as defined in the appended claims.

We claim:

1. A compound of the formula

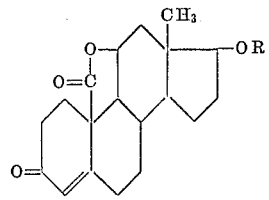

wherein R is selected from the group consisting of hydrogen and an acyl radical of a hydrocarbon carboxylic acid having 1 to 7 carbon atoms.

2. The 10-11 lactone of 17β-benzoyloxy-Δ⁴-estrene-11β-ol-3-one-10β-carboxylic acid.

3. The 10-11 lactone of Δ⁴-estrene-11β,17β-diol-3-one-10β-carboxylic acid.

4. A compound of the formula

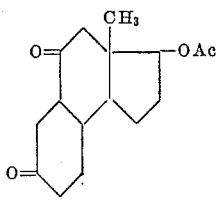

wherein Ac is an acyl radical of a hydrocarbon carboxylic acid having 1 to 7 carbon atoms.

5. A compound of the formula

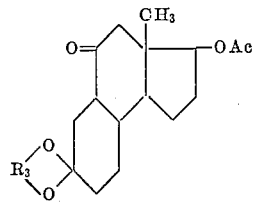

wherein Ac is an acyl radical of a hydrocarbon carboxylic acid having 1 to 7 carbon atoms and R₃ is lower alkylene.

6. A compound of the formula

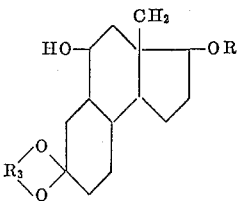

wherein R is selected from the group consisting of hydrogen and an acyl radical of a hydrocarbon carboxylic acid having 1 to 7 carbon atoms and R₃ is lower alkylene.

7. A compound of the formula

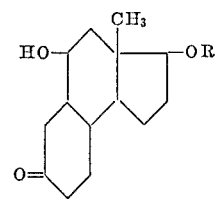

wherein R is selected from the group consisting of hydrogen and an acyl radical of a hydrocarbon carboxylic acid having 1 to 7 carbon atoms.

8. A compound of the formula

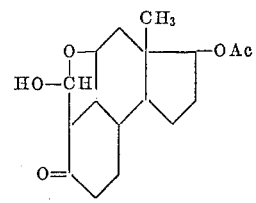

wherein Ac is an acyl radical of a hydrocarbon carboxylic acid having 1 to 7 carbon atoms.

9. A compound of the formula

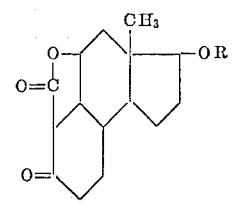

wherein R is selected from the group consisting of hydrogen and an acyl radical of a hydrocarbon carboxylic acid having 1 to 7 carbon atoms.

10. The 10-11 lactone of 17β-benzoyloxy-des A-estrane-11β-ol-5-one-10β-carboxylic acid.

11. A compound of the formula

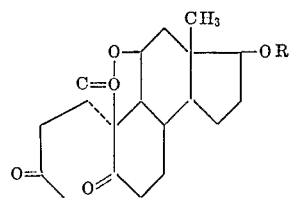

wherein R is selected from the group consisting of hydrogen and an acyl radical of a hydrocarbon carboxylic acid having 1 to 7 carbon atoms.

12. The 10-11 lactone of 17β-benzoyloxy-4,5-seco-estrane-11β-ol-3,5-dione-10β-carboxylic acid.

13. A compound of the formula

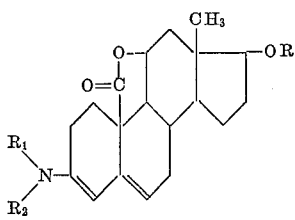

wherein R is selected from the group consisting of hydrogen and an acyl radical of a hydrocarbon carboxylic acid having 1 to 7 carbon atoms and $R_1$ and $R_2$ are lower alkyl and when taken together with the nitrogen atom form a radical selected from the group consisting of morpholino, pyrrolidino and piperidino.

14. The 10-11 lactone of 3-pyrrolidino-17β-benzoyloxy-$\Delta^{3,5}$-estradiene-11β-ol-10β-carboxylic acid.

15. A compound of the formula

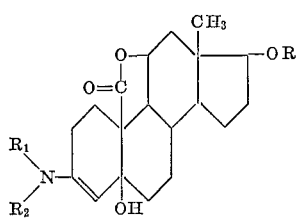

wherein R is selected from the group consisting of hydrogen and an acyl radical of a hydrocarbon carboxylic acid having 1 to 7 carbon atoms and $R_1$ and $R_2$ are lower alkyl radical selected from the group consisting of morpholino, and when taken together with the nitrogen atom form a pyrrolidino and piperidino.

16. The 10-11-lactone of 3-pyrrolidino-17β-benzoyloxy-$\Delta^3$-estrene-5,11β-diol-10β-carboxylic acid.

17. A process for the preparation of 10-11 lactones having the formula

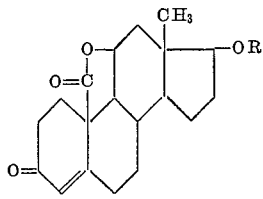

wherein R is selected from the group consisting of hydrogen and an acyl radical of a hydrocarbon carboxylic acid having 1 to 7 carbon atoms wihch comprises reacting 5-lower alkylene-dioxy-9α,11α-epoxy-17β-acyloxy-des A-estrane wherein the acyl radical is derived from a hydrocarbon carboxylic acid having 1 to 7 carbon atoms with formic acid to form 17β-acyloxy-des A-estrane-5,11-dione, reacting the latter with a ketalizing agent to form 5-lower alkylenedioxy-17β-acyloxy-des A-estrane-11-one, reducing the latter with an alkaline hydride to form 5-lower alkylenedioxy-17β-OR-des A-estrane-11β-ol wherein R has the above definition, hydrolyzing the latter under acidic conditions to form 17β-OR-des A-estrane-11β-ol-5-one, reacting the latter to form the 10-11 lactone of 17β-OR-des A-estrane-11β-ol-5-one-17β-carboxylic acid, condensing the latter with methyl vinyl ketone in the presence of an alkaline condensation agent to form the 10-11 lactone of 17β-OR-4,5-seco-estrane-11β-ol-3,5-dione-10β-carboxylic acid, reacting the latter with a secondary amine selected from the group consisting of dilower alkyl amine, piperidine, pyrrolidine and morpholine to form a mixture of the 10-11 lactone of the corresponding 3-enamino-17β-OR-$\Delta^{3,5}$-estradiene-11β-ol-10β-carboxylic acid and the 10-11 lactone of the corresponding 3-enamino-17β-OR-$\Delta^3$-estrene-5,11β-diol-10β-carboxylic acid, hydrolyzing the latter mixture under acidic conditions to form the 10-11 lactone of 17β-OR-$\Delta^4$-estrene-11β-ol-3-one-10β-carboxylic acid wherein R has the above definition and recovering the latter.

18. The process of claim 17 wherein 17β-OR-des A-estrane-11β-ol-5-one is reacted with a lower alkyl carbonate in the presence of an alkaline agent capable of transforming a carbonyl group into its alkali metal enolate to form the 10-11 lactone of 17β-OR-des A-estrane-11β-ol-5-one-10β-carboxylic acid.

19. The process of claim 17 wherein 17β-OR-des A-estrane-11β-ol-5-one, R representing an acyl radical of a hydrocarbon carboxylic acid having 1 to 7 carbon atoms, is reacted with a lower alkyl formate in the presence of an alkaline agent capable of transforming a carbonyl radical into its alkali metal enolate to form the 10-11 hemi-acetal of 10β-formyl-17β-OR-des A-estrane-11β-ol-5-one and oxidizing the latter to form the 10-11 lactone of 17β-OR-des A-estrane-11β-ol-5-one-10β-carboxylic acid, wherein R has the above definition.

20. A process for the preparation of the 10-11 lactone of 17β-benzoyloxy-$\Delta^4$-estrene-11β-ol-3-one-10β-carboxylic acid which comprises reacting 5-ethylenedioxy-9α,11α-epoxy-17β-benzoyloxy-des A-estrane with formic acid to form 17β-benzoyloxy-des A-estrane-5,11-dione, reacting the latter with methyl ethyl dioxolane in the presence of p-toluene sulfonic acid to form 5-ethylenedioxy-17β-benzoyloxy-des A-estrane-11-one, reducing the latter with an alkali metal borohydride to form 5-ethylenedioxy-17β-benzoyloxy-des A-estrane-11β-ol, hydrolyzing the latter in the presence of an acid to form 17β-benzoyloxy-des A-estrane-11β-ol-5-one, reacting the latter with a lower alkyl formate in the presence of an alkaline agent capable of transforming a carbonyl radical into its alkali metal enolate to form the 10-11 hemiacetal of 10β-formyl-17β-benzoyloxy-des A-estrane-11β-ol-5-one, oxidizing the latter to form the 10-11 lactone of 17β-benzoyloxy-des A-estrane-11β-ol-5-one-10β-carboxylic acid, condensing the latter with methyl vinyl ketone in the presence of a tertiary amine to form the 10-11 lactone of 17β-benzoyloxy-4,5-seco-estrane-11β-ol-3,5-dione-10β-carboxylic acid, reacting the latter with pyrrolidine to form a mixture of 10-11 lactone of 3-pyrrolidino-17β-benzoyloxy-$\Delta^{3,5}$-estradiene-11β-ol-10β-carboxylic acid and the 10-11 lactone of 3 - pyrrolidino - 17β - benzoyloxy-$\Delta^3$-estrene-5,11β-diol-10β-carboxylic acid, hydrolyzing the latter mixture under acidic conditions to form the 10-11 lactone of 17β-benzoyloxy-$\Delta^4$-estrene-11β-ol-3-one-10β-carboxylic acid and recovering the latter.

No references cited.

UNITED STATES PATENT OFFICE
CERTIFICATE OF CORRECTION

Patent No. 3,138,591                                   June 23, 1964

Gérard Nominé et al.

It is hereby certified that error appears in the above numbered patent requiring correction and that the said Letters Patent should read as corrected below.

Column 4, line 38, for "17β-OR'-" read -- 17β-OR- --; column 6, line 47, for "-5,11-DIONE" read -- 11-ONE --; column 12, lines 1 to 9, for that portion of the formula reading

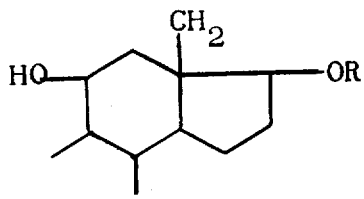 read 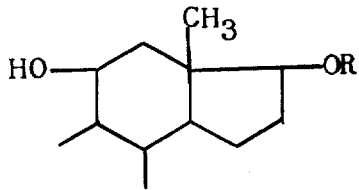

same column 12, lines 61 to 69, the upper left-hand portion of the formula should appear as shown below instead of as in the patent:

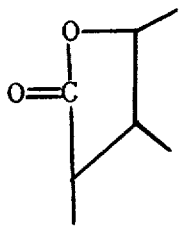

column 13, lines 33 to 35, strike out "radical selected from the group consisting of morpholino, and when taken together with the nitrogen atom form a pyrrolidino and piperidino" and insert instead -- and when taken together with the nitrogen atom form a radical selected from the group consisting of morpholino, pyrrolidino and piperidino --; line 50, for "wihch" read -- which --; column 14, line 1, for "one-17β-" read -- one-10β- --.

Signed and sealed this 9th day of March 1965.

(SEAL)
Attest:

ERNEST W. SWIDER                              EDWARD J. BRENNER
Attesting Officer                               Commissioner of Patents